(12) United States Patent
Lange et al.

(10) Patent No.: US 11,602,242 B2
(45) Date of Patent: Mar. 14, 2023

(54) PORTABLE GRILL DEVICE

(71) Applicant: L & W Holding UG, Unkel (DE)

(72) Inventors: Thomas Lange, Winningen (DE); Stefan Wichmann, Unkel (DE)

(73) Assignee: L & W HOLDING UG, Unkel (DE)

( * ) Notice: Subject to any disclaimer, the term of this patent is extended or adjusted under 35 U.S.C. 154(b) by 343 days.

(21) Appl. No.: 16/771,988

(22) PCT Filed: Dec. 12, 2017

(86) PCT No.: PCT/EP2017/082307
§ 371 (c)(1),
(2) Date: Jun. 11, 2020

(87) PCT Pub. No.: WO2019/057318
PCT Pub. Date: Mar. 28, 2019

(65) Prior Publication Data
US 2021/0068587 A1    Mar. 11, 2021

(30) Foreign Application Priority Data

Sep. 20, 2017 (DE) ...................... 10 2017 121 840.8

(51) Int. Cl.
| | |
|---|---|
| A47J 37/07 | (2006.01) |
| A47J 37/04 | (2006.01) |
| A47J 37/06 | (2006.01) |
| A47J 36/32 | (2006.01) |

(52) U.S. Cl.
CPC ........... *A47J 37/043* (2013.01); *A47J 36/321* (2018.08); *A47J 37/0688* (2013.01); *A47J 37/0745* (2013.01); *A47J 37/0786* (2013.01); *A47J 2037/0795* (2013.01)

(58) Field of Classification Search
CPC .. A47J 37/043; A47J 37/0745; A47J 37/0688; A47J 37/0786; A47J 36/321; A47J 2037/0795
See application file for complete search history.

(56) References Cited

U.S. PATENT DOCUMENTS

| | | |
|---|---|---|
| 5,515,774 A | 5/1996 | Swisher |
| 2009/0107346 A1 | 4/2009 | Home |

FOREIGN PATENT DOCUMENTS

| | | |
|---|---|---|
| CN | 106264186 A | 1/2017 |
| DE | 2641127 A1 | 7/1978 |
| DE | 8603414 U1 | 6/1987 |

(Continued)

OTHER PUBLICATIONS

International Search Report for PCT/EP2017/082307 dated Apr. 23, 2018.

*Primary Examiner* — Alfred Basichas
(74) *Attorney, Agent, or Firm* — Schmeiser, Olsen & Watts, LLP

(57) ABSTRACT

Provided is a portable grill device including at least one substantially vertical, flat heat source, at least one support for food to be grilled that is arranged in front of the heat source, at least one drive unit for rotating the at least one support for food to be grilled about a substantially vertical axis of rotation, and a power supply for supplying the drive unit with the power required for the operation thereof. The portable grill device includes at least one adjustment unit which is designed to steplessly adjust a spacing between the at least one heat source and the at least one support for food to be grilled, during operation of the grill device.

13 Claims, 11 Drawing Sheets

(56) References Cited

FOREIGN PATENT DOCUMENTS

| | | |
|---|---|---|
| DE | 20309120 U1 | 9/2003 |
| DE | 102010019366 A1 | 11/2011 |
| DE | 102013020112 A1 | 10/2014 |
| FR | 2023305 A1 | 8/1970 |

PORTABLE GRILL DEVICE

CROSS-REFERENCE TO RELATED APPLICATIONS

This application claims priority to PCT Application No. PCT/EP2017/082307, having a filing date of Dec. 12, 2017, the entire contents of which is hereby incorporated by reference.

FIELD OF TECHNOLOGY

The following relates to a portable grill device comprising at least one flat heat source that is arranged substantially vertically, at least one support for food to be grilled that is arranged in front of the heat source, at least one drive unit for rotating the at least one support for food to be grilled about a substantially vertical axis of rotation, and a power supply for supplying the at least one drive unit with the power required for the operation thereof.

BACKGROUND

Portable grill devices are known from the conventional art which in principle make it possible to grill food to be grilled at any desired location, for example when camping. In this case, the food to be grilled is cooked on a grill over a heat source, for example a carbon bed or a gas burner. A disadvantage thereof is that the food to be grilled is heated only from one side, and therefore the food to be grilled has to be regularly turned by hand, and there is a risk of the food to be grilled burning on the underside. Furthermore, fluid from the food to be grilled may drip onto the heat source and contaminate it, which often requires laborious cleaning.

Furthermore, grill devices are known which are designed as a skewer. The skewers are loaded with food to be grilled that is pressed closely together, such as rotisserie chicken, in order to subsequently be rotated in a heating device, in a horizontal orientation. In this manner, the food to be grilled is cooked uniformly on all sides. A disadvantage of skewers, however, is that the loading thereof is laborious, since the food to be grilled has to be fixed such that it cannot fall down during the rotation. Furthermore, the grill devices are generally too bulky to be carried to their location of use.

FR 2 023 305 A1 describes a sausage boiler as a development of grill devices of the type in question, having a rotatable retainer for food to be grilled. Since the retainer for food to be grilled rotates about a vertical axis of rotation, it can be loaded in a simpler and quicker manner than in the case of a horizontal axis of rotation. Furthermore, the grill device is described as "not bulky", wherein specific size and weight specifications are missing, however, and so it remains open as to whether the described grill device can be considered "portable".

DE 10 2013 020 112 A1 likewise describes a grill device comprising a retainer for food to be grilled that rotates about a vertical axis of rotation. These can be cleaned more easily by means of elements of supports for food to be grilled that are detachably fixed to a retaining frame, and the cooking chamber can be used more flexibly and efficiently for different types and sizes of food to be grilled than is the case in grill devices according to FR 2 023 305 A1. Statements regarding the size and weight of the grill device are lacking. It should therefore be assumed that the grill device is not portable. Furthermore, the heat intensity striking the food to be grilled can be regulated only by means of the power of the heating elements, which results, in particular in the case of coal or gas heating, in it not being possible for the heat intensity to be optimally adjusted to different food to be grilled or different phases of the grilling process.

This results in the technical problem of providing a portable grill device by means of which food to be grilled is heated in a simple and safe manner, and which can be used for a wide range of types of food to be grilled.

SUMMARY

A portable grill device according to embodiments of the invention comprises at least one heat source. The heat source is substantially vertically oriented and/or flat. Furthermore, the grill device comprises at least one support for food to be grilled. The support for food to be grilled is arranged in front of the heat source. Furthermore, the grill device comprises at least one drive unit for rotating the at least one support for food to be grilled about a substantially vertical axis of rotation. Furthermore, the grill device comprises a power supply for supplying the drive unit with the power necessary for the operation thereof, and/or an adjustment unit which is designed to steplessly adjust a spacing between the at least one heat source and the at least one support for food to be grilled, during operation of the grill device.

Within the meaning of embodiments of the invention, "portable" means that the grill device can be transported by one individual person, without aids. This applies for example for a grill device of which the length, width and height are each less than 65 cm, and the weight of which is less than 20 kg, in particular less than 15 kg.

A flat heat source is characterized in that it emits heat mainly via a radiating surface, the length and width of which are in each case greater than the dept of the heat source with respect to the radiating surface. The heat source can be designed for example as an electrical radiant heater, a gas radiant heater, or a suitable enclosed carbon bed. In this connection, a vertical orientation is to be understood to mean that the heat source is oriented such that the radiating surface thereof is in a vertical plane. A vertical orientation is advantageous in that the food to be grilled that is to be heated can be arranged not above, but rather in front of, the heat source. This prevents components of the food to be grilled, such as fat from the food to be grilled, from dropping onto the heat source, as a result of which the heat source may be damaged, or a user may be injured by being burned.

The at least one support for food to be grilled is arranged in front of the heat source, i.e. on the side of the greatest heat emission of the heat source. The support for food to be grilled can for example be a rotary plate which is attached, for example, on the vertically oriented axis of rotation of an electric motor such that the food to be grilled that is placed thereon is rotated in front of the heat source. Safe and uniform heating is thereby achieved in a simple manner. A grill device according to embodiments of the invention can be used for cooking, heating and/or keeping warm any type of food to be grilled, such as meat, fish poultry, sausages or vegetables.

A portable grill device according to embodiments of the invention comprises at least one adjustment unit which is designed to steplessly adjust a spacing between the at least one heat source and the at least one support for food to be grilled, during operation of the grill device. Adjusting the spacing between the heat source and the support for food to be grilled makes it possible for the heat intensity striking the food to be grilled to be adjusted quickly and steplessly, depending on the type of food to be grilled and the desired treatment and/or treatment phase. In this case, it is particularly advantageous for the spacing to also be able to be changed during the operation of the grill device. A larger spacing brings about a low intensity, and thus gentle heating or just keeping warm; a smaller spacing brings about a high intensity and thus faster heating. The stepless adjustment means or stepless adjustment that the optimal heat intensity can be set for every situation.

The adjustment unit is designed such that the support for food to be grilled is moved, relative to the surrounding system of the grill device, by means of the adjustment unit. It is also conceivable, however for the adjustment unit to move the heat source relative to the surrounding system. The latter variant, however, involves the risk of the heat source causing burns to people or objects in the surroundings of the grill device, by means of adjustment, if the heat source comes too close to the people or objects.

In order to allow for adjustment during operation, operating elements, for example handles, of the adjustment unit are advantageously attached in regions of lower thermal load, for example under the support for food to be grilled. For reasons of ergonomics operating elements are advantageously located on the side of the grill device facing the operator.

The at least one support for food to be grilled can be supported by means of at least one supporting frame comprising a plurality of contact surfaces for placing on a plurality of supports for food to be grilled that are arranged vertically one above the other, and so as to be concentric with respect to the vertical axis of rotation. The supporting frame makes it possible for supports for food to be grilled that are laden with food to be grilled to be arranged quickly and easily in the grill device and to be exchanged at the end of a grilling process. In particular, depending on the food to be grilled, different supports for food to be grilled can be used, and/or the supports for food to be grilled can be arranged differently, in particular at different heights, such that an optimal grilling result is achieved and the grill device is used efficiently. In particular a combination of the supporting frame with a vertically oriented heat source is advantageous, since in this case the height distribution of the food to be grilled, on the supporting frame, can be selected independently of the spacing from the heat source. For example, the height distribution can be optimized for optimal use of space, and the spacing from the heat source can be adjusted independently thereof, for an optimal grilling result.

The supporting frame may comprise a number of support rods. each comprising a number of contact surfaces. The support rods are advantageously vertically oriented and/or arranged so as to be equidistant from the vertical axis of rotation, in order to support the support for food to be grilled in a uniform manner. Within the meaning of embodiments of the invention "equidistant" means that the support rods are at the same spacing from the axis of rotation, in a plane orthogonal to the axis of rotation.

For the purpose of particularly stable support of the support for food to be grilled, at least three support rods are provided, since three contact surfaces make it possible to stably support almost any shape of support for food to be grilled.

Advantageously the in particular at least three support rods are arranged such that the intersection points thereof rest, having a plane orthogonal to the axis of rotation, on a support arc of a circle that is concentric to the axis of rotation, in particular such that the points of intersection are distributed uniformly on the support arc. In order that a support for food to be grilled can be held in a stable manner on the support rods, by contact surfaces, the common center of gravity of the support for food to be grilled and the food to be grilled supported thereby should be located on a vertical axis that intersects the circular segment limited by the support arc and the chord limiting the ends of the arc. In order to meet this requirement for food to be grilled that is arranged centrally on a support for food to be grilled, the support arc advantageously has a central angle of at least 180°.

If the, for example three, support rods are arranged so as to be straight and in parallel with the axis of rotation, they advantageously intersect a plane orthogonal to the axis of rotation at 0°, 90° and 180° in cylinder coordinates, with respect to the axis of rotation on a support arc of a circle concentric to the axis of rotation. As a result, a centrally laden support for food to be grilled can be supported in a stable manner and can be guided, in a simple manner and without tilting in the horizontal direction, into or out of the supporting frame, via an opening arc having a central angle of 180°, outside of the support arc.

If the, for example three, support rods are arranged so as to be curved and/or so as to be at a spacing from the axis of rotation that widens upwards, they advantageously intersect a plane orthogonal to the axis of rotation, on a support arc, at a central angle of over 180°, in particular of 0°, 120° and 240° in cylinder coordinates, with respect to the axis of rotation of a circle concentric to the axis of rotation. A larger central angle of the support arc advantageously results in more stable support of the support for food to be grilled, in particular an arrangement of the support rods at 0°, 120° and 240° leads to the most stable support possible by means of three support rods. Curved support rods and/or support rods arranged having a spacing from the vertical axis of rotation that widens upwards make it possible to achieve a mutual spacing of the support rods that widens, upwards, above the contact surface, on a removal portion, in each case. As a result, in order to be removed from the supporting frame a support for food to be grilled can be raised form the contact surface into the removal portion, and there guided out of the supporting frame, without tilting in the horizontal direction. Insertion of the support for food to be grilled is likewise easily possible, in the reverse manner.

In order to achieve the simplest possible structure of the supporting frame, the support rods are advantageously straight, and each comprise, as contact surfaces, a number of projections and/or depressions that face the vertical axis of rotation. The projections can, for example, be formed integrally with the relevant support rod or can be in particular detachably connected thereto, for example welded thereon, soldered thereon, screwed thereto, pinned thereto and/or clamped thereto.

The straight support rods can be arranged so as to be at a spacing from the vertical axis of rotation that widens upwards. In this case, the relevant side of the support rods facing the vertical axis of rotation in each case forms a continuous contact surface, on which supports for food to be grilled can be placed in a stable manner, between the support rods, at different heights depending on the horizontal extension of the support for food to be grilled. This results in the particular advantage that supports for food to be grilled that are of different sizes with respect to the horizontal extension thereof can be used with the same supporting frame, and in particular a horizontal extension of the support for food to be grilled does not have to be selected so as to be especially adjusted to a spacing of the support rods.

The support rods may be curved, such that a spacing of the support rods from the vertical axis of rotation varies along the vertical axis of rotation, in particular periodically, for example sinusoidally. As a result, supports for food to be grilled can be securely inserted between the support rods, even without the support rods comprising projections and/or depressions.

The support rods can be connected by at least one connection element, for example welded, soldered, clamped, riveted and/or screwed therewith. The connection element increases the stability of the supporting frame, in particular if the frame rotates and/or is loaded in a non-uniform manner by food to be grilled. The support rods can advantageously be connected at an upper and/or lower end of the support rods, such that the connection element does not impede the loading of the supporting frame with supports for food to be grilled. At least one connection element may be formed so as to be annular or discoid for example. The connection element that is arranged in particular at the lower end and/or that is discoid can be operatively connected to the drive unit and/or arranged so as to be concentric to the vertical axis of rotation.

The described supporting frame can of course also be advantageously used independently of the grill device described herein in particular in grill devices of the type in question.

A heat source according to embodiments of the invention can be designed as a gas radiant heater. In comparison with electrical radiant heaters, the advantage emerges that the gas cylinders or gas cartridges required for operating a gas radiant heater are easy to transport to the place of use. In contrast, a portable power supply for electrical radiant heaters can be achieved only with difficulty, owing to the high power consumption thereof. In contrast with a vertically oriented carbon bed, a gas radiant heater is advantageous in that the operator can achieve a uniform heat output in a simpler and quicker manner. Furthermore, lower smoke, dust and odor emissions result, which in particular people not involved can find disturbing.

A heat source that is designed, according to embodiments of the invention, as a gas radiant heater can comprise a fastening element for detachably fastening a gas cartridge that is connected to the gas radiant heater, and/or an electrically controllable valve for adjusting the gas flow into the gas radiant heater, A gas cartridge can be connected to the gas radiant heater for example by means of a plug-in, screw or bayonet connection, known from gas camping stoves, and in the process be inserted, at least in part, into a fastening element that is formed for example as a retaining ring, for example made of metal or heat-resistant plastics material. The fastening element retains the gas cartridge on the gas radiant heater in a reliable manner, such that dangers resulting from unintentional detachment of the gas cartridge, and thus gas being released in an uncontrolled manner, can be prevented.

A controllable valve advantageously makes it possible for the heating power output by the gas radiant heater to be appropriately adjusted, depending on the type of food to be grilled and the intended treatment and/or treatment phase, for example gently keeping warm or rapid roasting. In the event of electrical controllability, the mentioned adjustment can furthermore also be carried out so as to be controlled in an electrically or electronically programmed manner.

A heat source according to embodiments of the invention can be provided with a number of heat-conducting plates which extend in the direction perpendicular to the radiating surface of the at least one heat source, as far as a minimum spacing of the axis of rotation of the at least one support for food to be grilled from the at least one heat source. Heat-conducting plates make it possible for more uniform heating of different regions of the food to be grilled to be achieved. In order to achieve as low a weight as possible, the heat-conducting plates can be produced from aluminum, wherein in particular anodized aluminum can be used to achieve a scratch-resistant surface in attractive colors. In a preferred embodiment, in each case one heat-conducting plate is attached vertically, directly to the lateral edges of the radiating surface of the heat source, and a further heat-conducting plate is attached horizontally above the heat source. The horizontal heat-conducting plate can in particular be attached so as to be spaced apart from the heat source, in order to prevent heat accumulation in the upper region in front of the heat source. The intermediate space between the heat source and the horizontal heat-conducting plate can be filled by a further vertical heat-conducting plate, in order that the heat does not escape through the intermediate space, to the rear of the heat source. If the heat-conducting plates extend perpendicularly to the radiating surface, as far as the spacing of the axis of rotation of the support for food to be grilled from the heat source, each region of the food to be grilled is guided in succession, upon each rotation of the support for food to be grilled, through a high-temperature region between the heat-conducting plates, a medium-temperature region at the ends of the heat-conducting plates, and a low-temperature region outside of the heat-conducting plates. As a result, even irregularly shaped food to be grilled, such as sausages, is heated uniformly. In order to increase the stability, the heat-conducting plates are advantageously fastened to one another and to the heat source, for example by means of screwing, riveting, welded joints and/or soldered joints.

A heat source according to embodiments of the invention can comprise a warming unit which is designed to be fixed, or detachable, in the waste heat flow above the at least one heat source, and to receive the food to be grilled and/or containers suitable for food to be grilled. In order to make efficient use of the grill device, it is advantageous to always load the grill device fully with food to be grilled, during operation. This can result, however, in fully cooked food to be grilled not being eaten immediately, and therefore the food to be grilled should advantageously be kept warm until it is eaten. For this purpose, for example a warming unit in the form of a heat-resistant bowl, a bowl retainer, or a grill, can be fastened to the upper face of the heat source or to a heat-conducting plate, such that the warming unit is heated by the waste heat flow from the heat source. A fastening that is easy to detach, for example comprising a plug-in system, in particular consisting of a number of rods which are plugged into hollow pipes, has the additional advantage that the warming unit can be temporarily separated from the grill device for serving the grilled food that is place thereon or therein.

A support for food to be grilled according to embodiments of the invention may be fixed to a retaining element in a height-adjustable and/or detachable manner. The support for food to be grilled advantageously comprises a substantially planar and horizontal surface for depositing or placing the food to be grilled, and is produced from a lightweight and/or heat-resistant material, for example aluminum, in particular anodized aluminum. Furthermore, the support for food to be grilled advantageously comprises a retaining portion, to which the support for food to be grilled can be detachably connected, for example by means of a latching, screw, plug-in or clamping connection with a retaining element. The retaining element according to embodiments of the invention can be L-shaped and/or formed in one, two or multiple pieces. In the case of an L-shape, the longer limb is oriented so as to be vertical and offset with respect to the axis of rotation of the drive unit, and the shorter limb is oriented horizontally and is at least indirectly operatively connected to the drive unit. The connection of the L-limbs can be designed as an angle or as a curve. In order to save weight, the retaining element is produced from aluminum and/or is hollow. The retaining element can comprise vertically mutually spaced depressions, openings and/or projections, for secure positioning of the support for food to be grilled. Furthermore, the retaining element can have a triangular, square or polygonal cross section, in order to prevent unintentional rotation of the support for food to be grilled about the retaining element.

Detachable and/or height-adjustable fixing of the support for food to be grilled is advantageous in that the support(s) for food to be grilled can be arranged in the grill device in a variable manner, depending on the type, size and quantity of the food to be grilled. Furthermore, the supports for food to be grilled can be easily removed and quickly and safely reinstalled, for example for purposes of cleaning and/or installation. An L-shaped retaining element according to embodiments of the invention makes it possible for supports for food to be grilled to be fixed to the retaining element at one region of the edge of the supports, in each case, and to be simultaneously rotated about an axis of rotation that is central with respect to the support for food to be grilled. This advantageously results in improved accessibility of the support for food to be grilled than is the case for example in the event of a fixing between the limbs of a U-shaped retaining element. At the same time, a more compact design of the grill device and more uniform heating of the food to be grilled is achieved than is the case for example in the event of the support for food to be grilled being fixed on one side, on a straight, vertical axis.

In a further advantageous embodiment, the at least one support for food to be grilled comprises at least one bowl of the support for food to be grilled, for receiving grilling fluid during the grilling process. This is advantageous in particular since the bowl of the support for food to be grilled collects meat juices and liquid fat, emerging from the food to be grilled during grilling, and/or prevents the fluids from dripping down onto further food to be grilled and/or parts of the grill device that are arranged there below. As a result, taste impairment is excluded, and hygiene is improved. In the simplest case, the bowl of the support for food to be grilled is detachably arranged on the element of the support for food to be grilled. This advantageously allows for quick removal of the finished grilled food, together with the bowl of the support for food to be grilled, as well as rapid re-loading with raw food to be grilled. In a preparation step, the bowls of the supports for food to be grilled are each loaded with one piece of food to be grilled and, if necessary, the ready bowls of supports food to be grilled are arranged on the corresponding element of the support for food to be grilled.

In order to detachably arrange the at least one bowl for food to be grilled on the at least one support for food to be grilled, it has been found to be advantageous for the support for food to be grilled to comprise an at least partially peripheral elevation that extends in the vertical direction. This elevation, which is formed as an edge region, is used for retaining the at least one bowl of a support for food to be grilled, and prevents the bowl from slipping from the support for food to be grilled during the cooking process. In addition to elevations of this kind, further retaining elements are also conceivable, such as guide grooves or other depressions which hold the at least one bowl of the support for food to be grilled on the support for food to be grilled, during the cooking process. Every support for food to be grilled that is provided comprises a corresponding bowl of a support for food to be grilled. The bowls of the supports for food to be grilled are made of metal, for example stainless steel or aluminum, or of heat-resistant plastics material.

In a further advantageous embodiment, the at least one bowl of the support for food to be grilled comprises an edge region that extends peripherally and widens upwards. Depending on the type of the food to be grilled, the casing region arranged between the edge region and the base surface can be of different heights. It is of course also conceivable that the opening and base surface may have the same diameter, or that the opening is designed so as to be smaller than the base surface.

This is advantageous since a casing region that tapers conically, upwards, acts as a splash guard, and meat juices and fats are collected in a splash-free manner. If a separate bowl of the support for food to be grilled is omitted, then the at least one support for food to be grilled can itself be designed as a bowl of a support for food to be grilled, and comprise an opening that widens upwards. Depending on the type of the food to be grilled, the casing region arranged between the edge region and the base surface can be of different heights. It is of course also conceivable that the opening and base surface may have the same diameter, or that the opening is designed so as to be smaller than the base surface.

The described bowls of the supports for food to be grilled can of course also be advantageously used independently of the grill device described herein in particular in grill devices of the type in question.

A support for food to be grilled according to embodiments of the invention can comprise at least one receiving unit for food to be grilled, comprising at least one support element, in particular in the form of a shaft-like extension for skewering a food to be grilled, a storage element for placing on a food to be grilled, a clamping element for clamping a food to be grilled, and/or a hook element for suspending a food to be grilled, and comprising at least one positioning means or positioner for positioning the receiving unit for food to be grilled on a support for food to be grilled and/or in a bowl for food to be grilled. The introduction of a receiving unit for food to be grilled comprising a support element allows for more uniform grilling and thorough cooking of the food to be grilled, since, unlike in the case when there is no support element, one side of the food to be grilled does not always rest on the support for food to be grilled and thus grill therewith only unsatisfactorily. In order to detachably fix the receiving unit for food to be grilled to the support for food to be grilled, or to the bowl of the support for food to be grilled, advantageously at least one positioning means or positioner is provided. As a result, it is possible to use different receiving units for food to be grilled, for different food to be grilled, with the same support for food to be grilled, and in each case the units can be detachably arranged in the best possible grilling position, in each case, for the food to be grilled.

The positioning means of a receiving unit for food to be grilled can be designed for example as a ring or disc, which fits exactly into a raised edge of the support for food to be grilled or in a bowl of the support for food to be grilled. In this embodiment, the positioning means is also used as a base for stabilizing the receiving unit for food to be grilled. A shaft-like extension for skewering a food to be grilled can be hollow, at least in part, and can be provided with at least one opening. As a result, flavor carriers, such as spices, herbs and/or a marinade can be introduced into the shaft-like extension, in order that the flavors transfer to the food to be grilled, during the grilling process. It is furthermore conceivable, in the simplest embodiment to form the shaft-like extension so as to be cylindrical, wherein the free end pointing upwards is formed so as to be closed. It is furthermore also conceivable for the shaft-like extension to be designed as a bell shape that widens towards the bottom, such that the food to be grilled has the largest possible common contact surface with the shaft-like extension. This is advantageous since, as a result, the grilling times are also reduced. Of course, the design of the shaft-like extension is not restricted to the cylindrical or bell-like shape, but rather can be changed as desired, depending on the shape of the food to be grilled.

The described receiving units for food to be grilled can of course also be advantageously used independently of the grill device described herein in particular in grill devices of the type in question.

Supports for food to be grilled, receiving units for food to be grilled, and bowls of supports for food to be grilled, according to embodiments of the invention, are formed of heat-resistant and lightweight plastics materials or metals, in particular from aluminum. For the purposes of improved cleaning, increased scratch-resistance and/or an attractive coloring, it is furthermore conceivable to modify the surface of the elements physically and/or chemically, for example by means of anodizing an aluminum surface.

The at least one support for food to be grilled, a supporting frame, and/or a retaining element of a grill device according to embodiments of the invention can be fixed, or detachably, to a substantially vertically oriented shaft which is operatively connected to the at least one drive unit. A detachable, for example screwed, fixing is advantageous in that different supports for food to be grilled and/or retaining elements can be easily mutually exchanged. The shaft is operatively connected to the drive unit for example by means of a V-belt and/or a transmission, in order that the drive unit can cause the shaft, and thus also the support for food to be grilled, to rotate. It is also conceivable for the shaft to be directly fastened to a rotor of the drive unit, or for a plurality of shafts to be operatively connected to one common drive unit. A suitable transmission makes it possible for a single drive unit to also be designed to drive a plurality of shafts at different rotational speeds.

The shaft according to embodiments of the invention is guided and mounted, in a portion of the shaft below the support for food to be grilled, in a guiding and bearing unit, in at least two vertically mutually spaced bearings, such as ball bearings. Since the shaft is guided and mounted only in a portion below the support for food to be grilled, a simpler structure of the grill device is achieved than in the case of guidance and/or mounting below and above the support for food to be grilled. In particular, guidance and mounting on just one side simplifies the use of a displacement unit according to embodiments of the invention. Furthermore, a guiding and bearing unit below the support for food to be grilled is exposed to a lower heat load than above, as a result of which the expected lifetime of the guiding and bearing unit is increased. In order to achieve high stability in particular also in the case of non-homogenous loading of the support for food to be grilled, despite the guidance being on just one side, a guide having as little play as possible is advantageous, as is achieved for example by means of two vertically mutually spaced ball bearings. It is also possible, however, for a double-rowed ball bearing, a ball bearing having little bearing clearance, a needle bearing, and/or a combination of a roller bearing with a guide bushing to be used instead of two ball bearings.

Particularly advantageously, the guiding and bearing unit can be protected from the penetration of foreign substances, such as fluid from the food to be grilled. The protection can be ensured for example by using encapsulated ball bearings.

The shaft can rest on the inner ring of a ball bearing, for example by means of a securing ring attached in a groove of the shaft, or a peripheral protrusion of the shaft. A vertical axis resting on a bearing means that the entire wight force of the food to be grilled and the support for food to be grilled is absorbed by the bearing, such that the drive unit has to overcome only the moment of inertia and the friction forces, which are very low in the case of ball bearings, in order to cause the food to be grilled to rotate. As a result, the drive unit can be dimensioned so as to be very small, light-weight and economical.

A drive unit according to embodiments of the invention can advantageously be arranged below the at least one support for food to be grilled, since this allows for a simple design and high stability of the grill device, and the drive unit cannot be damaged by the heat rising from the heat source.

A drive unit according to embodiments of the invention can be designed to cause the at least one support for food to be grilled to rotate at an adjustable speed and/or in a manner having an adjustable speed profile. Depending on the food to be grilled, a faster or slower rotation may be advantageous, for an optimal grilling result, such that the grill device can be used in a more flexible manner, due to an adjustable speed of rotation. In particular, it is also possible that different cooking phases of a food to be grilled may require different speeds of rotation. Therefore, a rotation having an adjustable speed profile, i.e. having a defined sequence of different speeds, is particularly advantageous for an optimal grilling result. An adjustable speed of rotation can be achieved in a particularly simple manner by means of an electric motor having an adjustable supply voltage.

A power supply according to embodiments of the invention can comprise at least one energy store, a battery or accumulator. The drive means or driver, which is advantageously designed so as to be economical, can be supplied with energy from the energy store over a longer period of time, in particular longer than the typical use duration of a grill device. The energy store achieves a self-contained power supply which makes it possible to operate the drive unit without external energy sources, such as an electrical plug. This results in the advantage that the grill device can be used at any desired location, in particular a location without power supply infrastructure, such as a remote campsite. However, in order to achieve the simplest possible design of the grill device it is also possible for a power supply without an energy store to be provided, which power supply is reliant, for the operation thereof, on an external energy source.

A power supply according to embodiments of the invention can comprise at least one charging unit for charging the at least one energy store, such as a wind turbine, a Peltier element, a photovoltaic module and/or a connection for an external power supply. The energy store can be charged by means of the charging unit, prior to or during uses of the grill device.

That is to say that when the energy store is exhausted it does not need to be exchanged or charged by an external charging device that may not be available. A further synergistic effect of the energy store and the charging unit is that the energy store can be charged for a longer charging time, and then the grill operation can be carried out for a shorter time. As a result, the charging unit can be formed so as to be lower power, and thus smaller, lighter in weight and more cost-effective, than a power supply for directly supplying the drive unit. For example, the energy store can be charged for a day by means of a solar module that can be designed so as to be small, and then the grilling operation can be carried out over a shorter operating time, in particular also in the dark, when solar cells do not function for example.

A combination of the energy store with a charging unit thus allows for more reliable and lower maintenance operation of the grill device, which appliance can at the same time be manufactured cost-effectively and be easily portable.

The connection for an external power supply can comprise, for example, a power cable comprising a corresponding plug for connection to a domestic socket or to an on-board socket of a land or water vehicle, and in particular a transformer. A transformer makes it possible for a voltage and/or frequency of an electrical current of the external power supply to be adjusted to the energy store. In particular, the connection for the external power supply can be designed for use with different current standards, for example 230 V/50 Hz, or 110 V/60 Hz alternating current, or 12 V or 24 V direct current.

Designing the charging unit as a wind turbine, Peltier element, photovoltaic module or another means for locally generating electrical power offers the particular advantage that the energy store can also be charged without an external power supply. In addition to atmospheric wind, a wind turbine can also make use of the updraught, generated by the heat source, for power generation. A Peltier element can generate electrical power from a temperature difference generated by the heat source. It is thus like an updraught wind turbine and, in contrast to a wind turbine for atmospheric wind, or a photovoltaic module, independent of ambient conditions of the grill device such as the wind strength or the brightness. Photovoltaic modules and Peltier elements have the common advantage of not requiring moving parts, which allows for low-maintenance operation and a long service life.

A power supply according to embodiments of the invention can comprise an output for connecting further energy loads. If the power supply is dimensioned such that the entire power thereof is not required by the drive device, the power supply can advantageously be used for supplying further loads. For this purpose, the power supply comprises an output, advantageously in the form of at least one domestic and/or on-board socket, to which for example cooling appliances for the food to be grilled and/or entertainment electronics devices can be connected.

An adjustment unit according to embodiments of the invention can be designed as the adjustment unit that supports at least one support for food to be grilled. Owing to the high heat load in the vicinity of the heat source and above the support for food to be grilled, which could damage an adjustment unit and injure an operator operating the adjustment unit, the adjustment unit is advantageously attached below the support for food to be grilled.

In addition to the support for food to be grilled, the adjustment unit advantageously also supports the drive unit and/or the power supply of the grill device. In this way, relative movements between the support for food to be grilled, the drive unit and/or the power supply when adjusting the adjustment unit are prevented, as a result of which a simpler mechanical connection between the grill device and drive unit, and/or energy connection between the drive unit and power supply, is made possible, since no flexible systems for force transmission, or flexible supply lines, are required.

An adjustment unit according to embodiments of the invention can be designed such that the vertical orientation of the axis of rotation of the support for food to be grilled is maintained in the event of a change in the spacing between the heat source and the support for food to be grilled. The fact that the axis of rotation is not tilted during the adjustment is advantageous in that the spacing of the support for food to be grilled from the heat source is independent of a vertical displacement of the support for food to be grilled along the axis of rotation thereof. The height adjustment of a height-adjustable support for food to be grilled is therefore independent of the setting of the spacing from the heat source, such that the same heat intensity, and thus the same grilling result, is achieved for any desired height settings.

The adjustment unit can for example comprise a support to which the support for food to be grilled or the drive means or driver thereof is attached, and which is displaceable on a rail system, for example by means of ball bearings or other roller bearings. A rail system, in particular consisting of two parallel rails which are attached below or to the side of the support of the adjustment unit, orthogonally to the radiating surface of the heat source, makes it possible to adjust the spacing of the support for food to be grilled from the heat source steplessly, in a particularly simple manner, and without tilting the axis of rotation of the support for food to be grilled. Ball bearings allow for particularly simple adjustment.

The adjustment unit, in particular a rail system and/or ball bearings of the adjustment unit can be protected, for example by means of plates arranged thereover, from contamination, for example by fluid dripping from the food to be grilled. As a result, low-friction functioning and a long service life of the adjustment unit are ensured.

If the grill device comprises more than one support for food to be grilled, individual supports for food to be grilled or groups of supports for food to be grilled can each be allocated separate adjustment units. As a result, supports for food to be grilled can be positioned simultaneously in a grill device, at different spacings from the heat source, such that different types of food to be grilled and/or food to be grilled in different phases of the grilling process can be grilled simultaneously, at an optimal spacing from the heat source, i.e. at an optimal temperature, in each case.

An adjustment unit according to embodiments of the invention can comprise at least one stop which specifies a minimum spacing between the at least one heat source and the at least one support for food to be grilled. As a result, collisions between the heat source and the support for food to be grilled, which could damage the elements, and/or overheating of the food to be grilled, are prevented.

An adjustment unit according to embodiments of the invention can comprise at least one arresting element for arresting the adjustment unit. If the adjustment unit can be arrested, for example by means of a clamp that engages on a rail system, the advantage results therefrom that uncontrolled movements, for example when transporting the grill device, are prevented.

An adjustment unit according to embodiments of the invention can comprise an adjustment drive for motorized driving of the adjustment unit. Motorization, for example by means of an electrical servomotor engaging on a rail system, is advantageous in that the adjustment can be controlled in an electrically and/or electronically programmed manner.

A grill device according to embodiments of the invention may comprise a regulation unit which is designed to regulate the speed of rotation of the drive unit, the heating power of the at least one heat source, and/or the position of the adjustment unit, such as electronically, such as in a programmed manner. If several instances of one component are present, the individual instances can be regulated independently of one another. The regulation unit designed, for example, as a micro-computer advantageously makes it possible to centrally control all the parameters relevant for an optimal grilling process.

The regulation unit can be designed to retrieve programs for preparing different foods to be grilled, from a database, and thereupon to automatically control the grill device in order to achieve an optimal grilling result. The regulation unit can furthermore be designed for recording user-defined programs.

The regulation unit can comprise at least one camera for imaging the food to be grilled. It is advantageously possible for a picture of the food to be grilled to be taken by means of the camera, for example a digital video camera, and to be shown for example using the display element. It is thus possible to monitor the cooking process of the food to be grilled, without having to open the grilling device or provide heavy and/or breakable windows for this purpose. The regulation unit can in particular comprise an image conductor, for example a fiber optic cable, which is designed for conducting an image of the food to be grilled to the camera. It is thereby possible for the camera to be arranged so as to be thermally insulated from the cooking chamber, and in particular from a heat source of the grill device, and still be able to take pictures of the food to be grilled. As a result, the camera is protected from too much heat exposure, which increases its service life.

The regulation unit can comprise at least one communications element for, such as wireless, exchange of measurement and/or control data with a mobile communications device. The mobile communications device can for example be a Smartphone or a tablet computer, on which a program for monitoring and/or controlling a grilling process of the grill device is installed. In one embodiment, the mobile communications device can function as a display and/or operating element for the grilling device. In particular, the image of the food to be grilled, taken by the camera, can be transmitted, such as continuously, to the mobile communications device, and displayed thereby. This results in the advantage that the grill device can also be monitored and/or controlled without direct contact between the user and the grill device. For example, a user can thus simultaneously prepare sides for a food to be grilled in a kitchen, and monitor the cooking process of the food to be grilled in a grill device set up in the open air.

A grill device according to embodiments of the invention can comprise a housing that surrounds the at least one drive unit, the power supply and/or the regulation unit, at least in part. The housing can consist for example of metal or plastics material, in particular of a light metal having a scratch-resistant surface, for example anodized aluminum. For the purpose of the simplest possible production of the grill device, it is advantageous for the housing to be made of the same material as the heat-conducting plates. The advantage of a housing is that the enclosed components are protected for example from liquid dripping down and/or from food to be grilled falling down. Furthermore, a housing protects the user for example from clamping their finger between movable parts of the drive unit, and it can also fulfil decorative purposes.

A housing according to embodiments of the invention can comprise at least one operating element and/or display element that is designed for setting and/or displaying the operating state at least of the at least one heat source, the at least one drive unit, the power supply, the adjustment unit and/or the regulation unit. The operating element can be designed for example as a switch, rotary control or slide control; a display element can be designed for example as a pointer instrument, digital display, indicator light or screen. The operating element and display element can also be connected in an operating and display element, for example in the form of a touch-sensitive screen. An operating state is understood, for example, to mean heating power, gas inflow and/or temperature of a heat source; speed of rotation of a drive unit; state of charge, power consumption and/or power output of the power supply, and/or position of an adjustment unit. In the case of the regulation unit, for example a pre-defined grilling program can be selected, started and monitored by means of the operating and/or display element, and/or the user can define their own grilling programs. The advantageous attachment of operating and/or display elements to the housing, in particular to the side facing the user, means that the elements are easy and convenient for the user to reach or read out during operation of the grill device.

A grill device according to embodiments of the invention can comprise at least one illumination element that is designed to illuminate the food to be grilled and/or the at least one operating element and/or display element. The illumination element comprises a number of LED lights which are supplied, for example, by the power supply, and/or are controlled by means of an operating element on the housing of the grill device. An illumination element advantageously allows the user to operate the grill device even in low ambient brightness.

The illumination element can comprise at least one optical fiber, in particular a fiber optic cable. The optical fiber makes it possible, for example, to conduct light from an in particular heat-sensitive light source, which is thermally insulated from a cooking chamber of the grill device, into the cooking chamber. In this way, it is possible to illuminate the food to be grilled in the cooking chamber without reducing the service life of the light source, for example an LED light, due to heat exposure. For this purpose, the optical fibers are designed so as to be heat-resistant, such as in a temperature range typical for grilling devices, at least in a portion exposed to heat. In addition or alternatively, it is conceivable for the illumination element to be arranged in a relatively cool portion, and to direct light to a number of heat- and/or dirt-resistant, and optionally adjustable, optical elements for reflection and/or diffusion of light, such as an optionally curved and/or pivotable mirror, which directs the light to a position of food to be grilled in the grill device and illuminates this. The optical elements are arranged in portions of the grill device at which the input of dirt during grilling operation, for example by means of grease splatters, is reduced.

A grill device according to embodiments of the invention can comprise at least one thermometer that can be detachably fixed to the at least one support for food to be grilled and/or a retaining element. The thermometer can comprise its own temperature display and/or can transmit the measured temperature via cable or radio to a regulation unit and/or a display element of the grill device. The thermometer can be detachably fixed, for example by means of a clamping, screw or plug-in connection. By means of a thermometer it is advantageously possible to check whether the temperature in the region of the food to be grilled corresponds to the optimal grilling temperature for the food to be grilled.

If the temperature is not optimal, the operator of the grill device, and/or the regulation unit, can for example regulate the heating power of the heat source and/or the spacing of the support for food to be grilled from the heat source such that the optimal temperature is achieved.

A grill device according to embodiments of the invention can comprise at least one clock, in particular a timer and/or a kitchen timer. The clock is advantageously attached to the housing, together with the operating and/or display elements, or is integrated in the operating and/or display elements The user of the grill device can monitor the grilling time of the food to be grilled, using the clock, and can also automatically begin and/or end the grilling process in the case of a timer.

A grill device according to embodiments of the invention can be designed so as to be open, i.e. without a housing that encloses at least the heat source and the support for food to be grilled on all sides. As a result, good accessibility of the support for food to be grilled, good ventilation of a heat source based on gas or coal combustion, and a low weight of the grill device are advantageously achieved.

A grill device according to embodiments of the invention can be folded or dismantled without the use of tools, and/or can comprise at least one carrying handle. The components of the grill device can be interconnected for example by means of a frame structure consisting of a plurality of frame elements which are interconnected for example by means of plug-in connections and/or joints. In order to save weight, the frame elements are advantageously produced from plastics materials and/or light metals, in particular aluminum. Furthermore, a frameless construction is also conceivable, in which the components of the grill device are interconnected by means of plates. In this case, the heat-conducting plates and/or the housing are advantageously incorporated, and/or the plates are connected in a hinged or detachable manner, at least in part. Edging the plates means that sufficient stability of a frameless construction can be achieved even in the case of thin plates. Options of folding and dismantling, and/or carrying handles, facilitates the transport of the grill device. A frameless construction makes it possible for a particularly low weight to be achieved.

The at least one carrying handle is thermally decoupled, by insulating means or an insulator, from the heat source that is mechanically connected thereto. The insulating means, for example a thermal reflective layer, an insulating material and/or a gas, in particular air, prevents the carrying handle from becoming too hot. This reduces the risk of burns for a user of the grilling device. Furthermore, the insulating means can reduce heat loss from a cooking chamber of the grill device, such that the cooking process takes place more efficiently and/or a less powerful and therefore smaller, lighter weight and/or more cost-effective heat source can be used.

The grill device can comprise at least one, height-adjustable, stand for setting up the grill device. The stand makes it possible for the grill device to advantageously be set up at a working height that is ergonomic for a user, in particular even if there is no suitable support, such as a table, available therefor. The stand can for example comprise a number of, in particular one, two, three or four, in particular collapsible, foldable and/or extendable legs. Particularly advantageously, the stand can comprise at least one motor for height-adjustment of the stand, for example in that the motor is designed to adjust the length of a number of, in particular one, two, three or four, telescopic legs. The motor allows for particularly convenient setting of a working height at the grill device. In particular, the stand can comprise a data memory for storing the relevant working height of a number of users. By means of the data memory, the working height can advantageously be set automatically, by the motor, for the relevant user.

Depending on the intended purpose, a grill device according to embodiments of the invention can also be equipped differently. For example, a single version comprising just one support for food to be grilled, and a family version comprising two supports for food to be grilled arranged one above the other, in each case, on two retaining elements, are conceivable. In a basic version, the family version could comprise a common heat source, drive unit and adjustment unit, in each case, for the two retaining elements. In higher-end design versions, heat sources, drive units and/or adjustment units that can be regulated separately could be provided for each retaining element. Of course, grill devices having a different number and/or distribution of supports for food to be grilled, and any desired combination of the mentioned features, are also conceivable.

BRIEF DESCRIPTION

Some of the embodiments will be described in detail, with reference to the following figures, wherein like designations denote like members, wherein.

DETAILED DESCRIPTION

Figure 1:
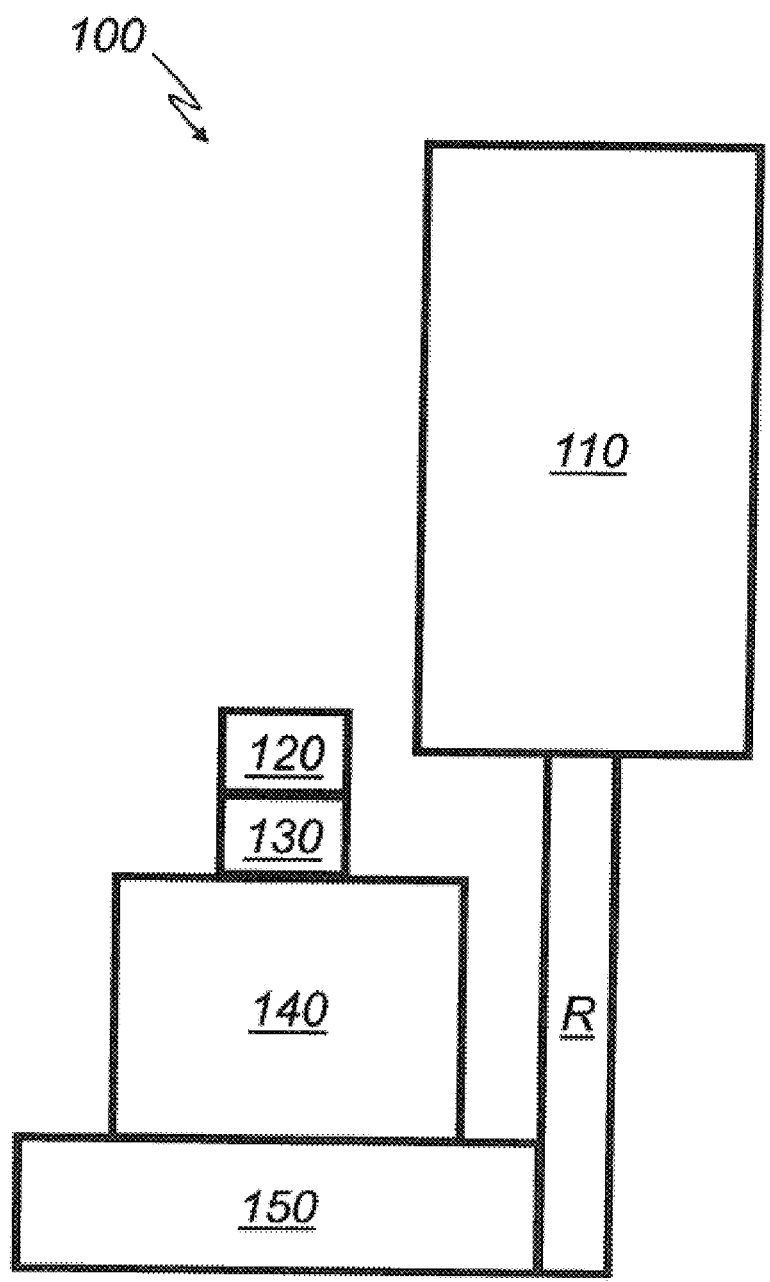
FIG. 1 is a schematic view of a grill device according to embodiments of the invention.

FIG. 1 is a schematic view of a grill device 100 according to embodiments of the invention, comprising a vertically arranged flat heat source 110, for example a gas radiant heater, and a support for food to be grilled 120 which is designed for example as plates fastened to the rotor of an electric motor. In the example shown, the electric motor functions as the drive unit 130 which rotates the support for food to be grilled 120 about a vertical axis of rotation (not shown), and which draws the energy required for the operation there of from a power source 140 which is designed for example as a transformer for connection to a domestic socket. The support for food to be grilled 120, the drive unit 130 and the power source 140 are attached to a displacement unit 150 which makes it possible to set the spacing between the support for food to be grilled 120 and the heat source 110 in a stepless manner. In the example shown, the displacement unit 150 is connected to the heat source 110 by means of a frame R of the grill device 100.

Figure 2:
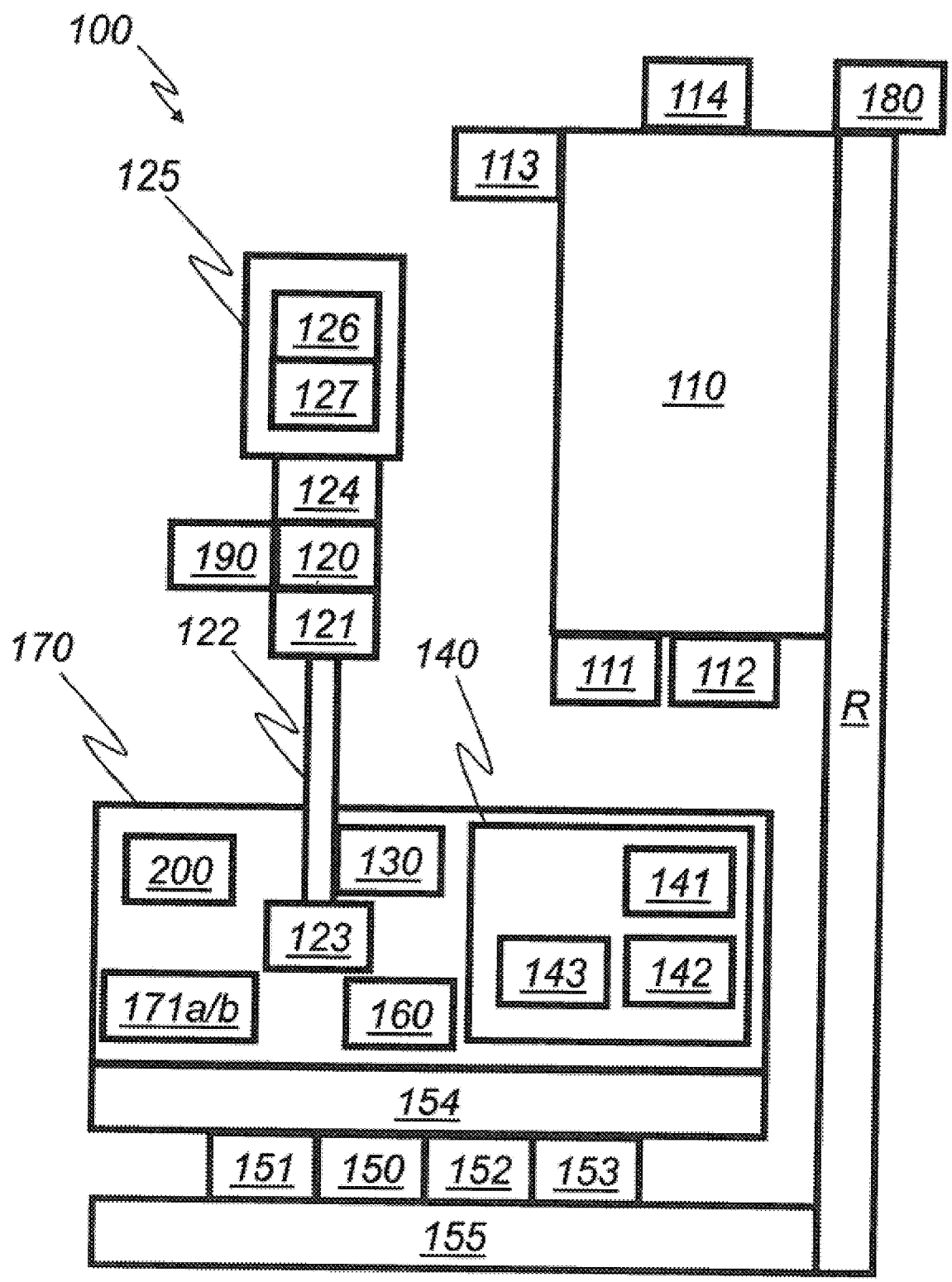
FIG. 2 is a schematic view of a grill device according to embodiments of the invention.

FIG. 2 is a further schematic view of a grill device 100 according to embodiments of the invention which, in addition to the features shown in FIG. 1, comprises the following features: The heat source 110, designed for example as a gas radiant heater, comprises a fastening element 111, for example a wire ring, into which a gas cartridge, attached to the heat source 110, can be pushed. The heat source 110 further comprises a for example electrically controllable valve 112 for setting the gas supply to the heat source. Heat-conducting plates 113 which are attached for example to the sides of and above the heat source, ensure uniform heating of the food to be grilled. A warming unit 114 can be fastened to the top of the heat source, for example by mean of a plug-in system. The warming unit 114 can be designed for example as a grill, on which the food to be grilled can be placed to keep warm.

The support for food to be grilled 120 is designed for example as a plate which is screwed, in a horizontal orientation, to the vertically oriented long limb of an L-shaped retaining element 121. In the example shown, the short limb of the L-shaped retaining element 121 screwed to the upper end of a vertically oriented shaft 122, wherein the bottom end of the shaft 122 is mounted and guided in a guiding and bearing unit 123, for example in the form of two vertically mutually spaced ball bearings. The shaft 122 is drive by the drive unit 130, designed for example as an electric motor, for example by means of an O-ring.

A bowl for food to be grilled 124 having a raised edge region can be attached to the support for food to be grilled 120, or the support for food to be grilled can itself comprise a raised edge region. A positioning means 127, for example in the form of a disc that fits exactly into the bowl for food to be grilled 124 makes it possible for a receiving unit for food to be grilled 125 to be positioned on the support for food to be grilled 120. The receiving unit for food to be grilled 125 comprises at least one support element 126 to which food to be grilled can be attached, in particular in a manner spaced apart from the support for food to be grilled 120. The support element 126 can be designed for example as a shaft-like extension on which food to be grilled, for example chicken, can be skewered. It is furthermore possible for a thermometer 190 for monitoring the temperature of the grilled food to be attached to the support for food to be grilled 120 or to the retaining element 121.

In the example shown, the power supply 140 for the drive unit 130 comprises an energy store 141, for example an accumulator, a charging unit 142 for the energy store, for example a photovoltaic module, and an output 143, for example in the form of an on-board plug, for connection to external energy loads such as a cooling appliance.

The grill device 100 shown furthermore comprises a regulation unit 160, for example a micro-computer, for controlling the speed of rotation of the drive unit 130, the heating power of the at least one heat source 110, and/or the position of the adjustment unit 150.

The guiding and bearing unit 123, drive unit 130, power supply 140 and regulation unit 160 are enclosed, at least on the top and at the front, by a housing 170, for example made of anodized aluminum. The housing 170 may comprise an operating and display unit 171*a/b*, for example in the form of rotary control, for setting the speed of rotation of the drive unit, and a switch comprising a control light for switching the power supply on and off. Furthermore, a clock 200, in particular a kitchen timer, for monitoring the grilling time of the food to be grilled can be attached to the housing.

In the example shown, the housing 170 is attached to the support 154 of an adjustment unit 150, by means of which the housing 170 can be displaced relative to the heat source 110, for example on a rail system 155 that is attached to a frame R of the grill device 100 that is connected to the heat source 110. For the purpose of convenient adjustment, the adjustment unit 150 comprises a or example electrical adjustment drive 153. Furthermore, the adjustment unit 150 comprises a stop 151 which prevents the support for food to be grilled 120 coming too close to the heat source 110, and an arresting element 152 by means of which the adjustment unit 150 can be arrested, for example for the purpose of risk-free transport of the grill device 100.

The grill device 100 shown comprises an illumination element 180, for example in the form of an LED light which is attached for example to the frame R, illuminates the support for food to be grilled 120 and/or the display and operating element 171*a/b*, and/or is supplied by the power supply 140.

Figure 3:
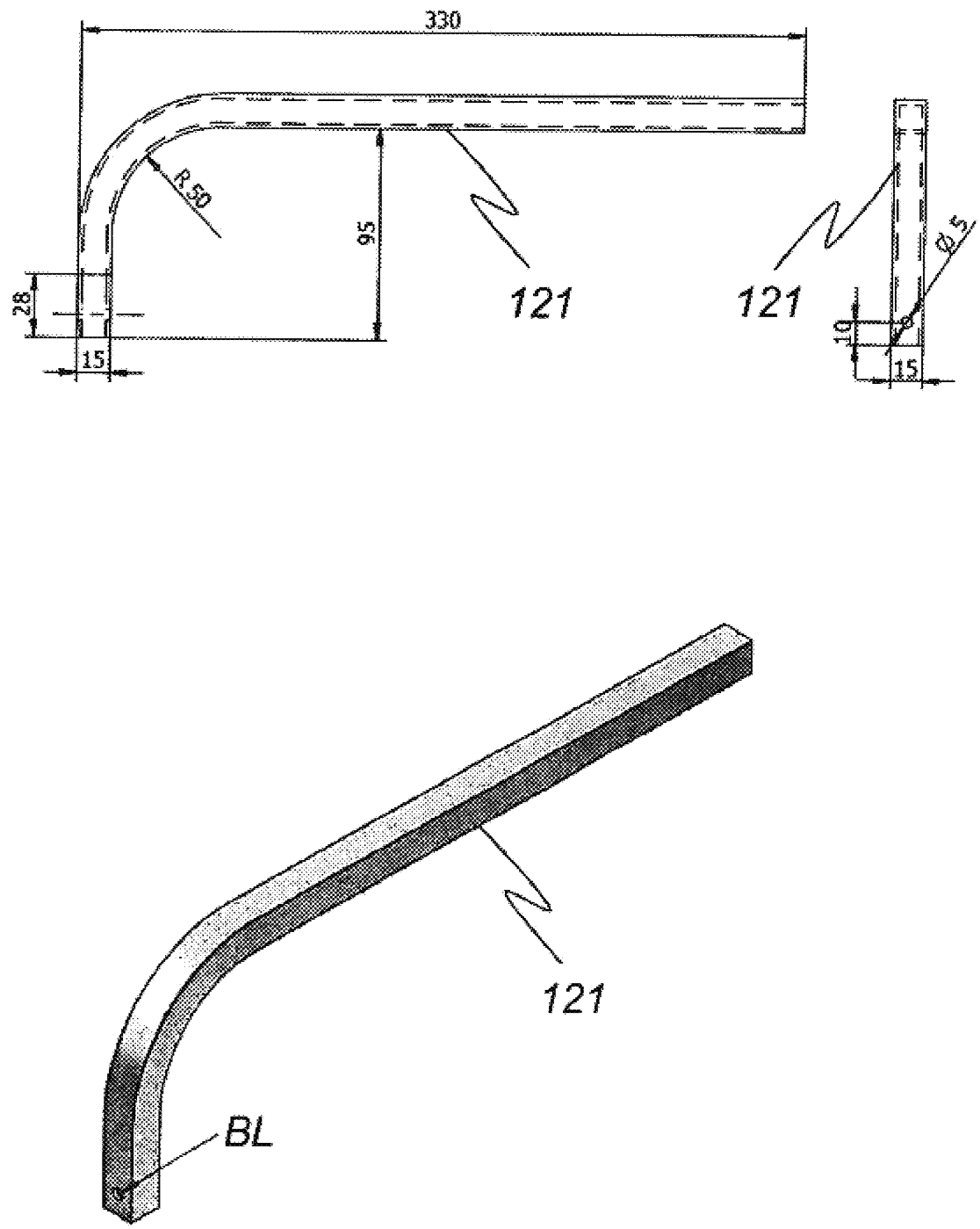
FIG. 3 shows a retaining element according to embodiments of the invention, by way of example.

FIG. 3 shows two dimensioned views and a perspective view of a retaining element 121 according to embodiments of the invention, by way of example. The retaining element 121 shown is L-shaped, having a curved transition between the two limbs. The cross section of the retaining element 121 shown is rectangular in order that a support for food to be grilled 120 attached to the retaining element 121 cannot rotate about the retaining element 121. Furthermore, a drilled hole BL is visible, through which the retaining element 121 can be fixed to a shaft 122, for example by means of a screw.

Figure 4:
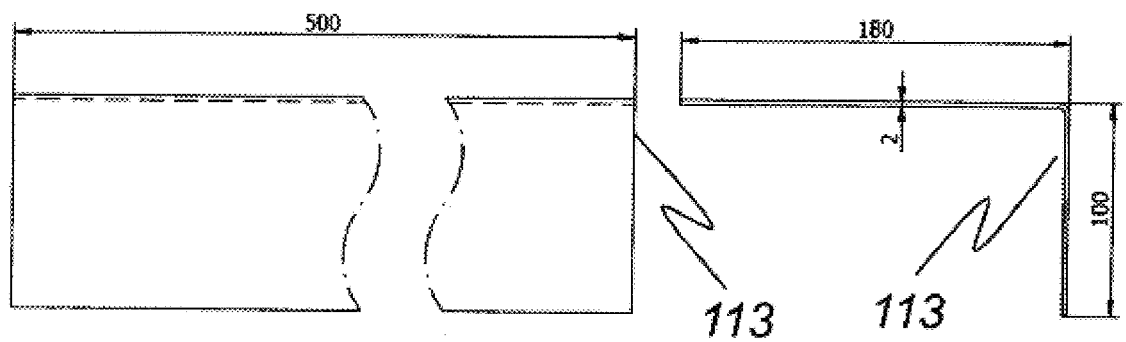
FIG. 4 shows a heat-conducting plate according to embodiments of the invention, by way of example.
Figure 4:
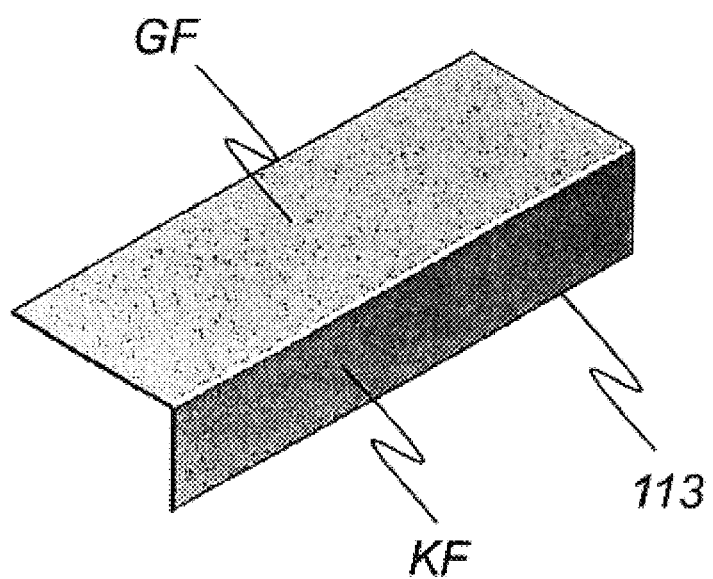

FIG. 4 shows two dimensioned views and a perspective view of a heat-conducting plate 113 according to embodiments of the invention, by way of example. The heat-conducting plate 113 shown can for example be attached to a heat source 110 such that the smaller surface KF vertically adjoins the upper edge of the heat source 110, and the larger surface GF extends horizontally, towards the support for food to be grilled 120, at a vertical spacing from the heat source that corresponds to the width of the smaller surface KF. The vertical spacing advantageously prevents a heat accumulation in the upper region of the heat source.

Figure 5:
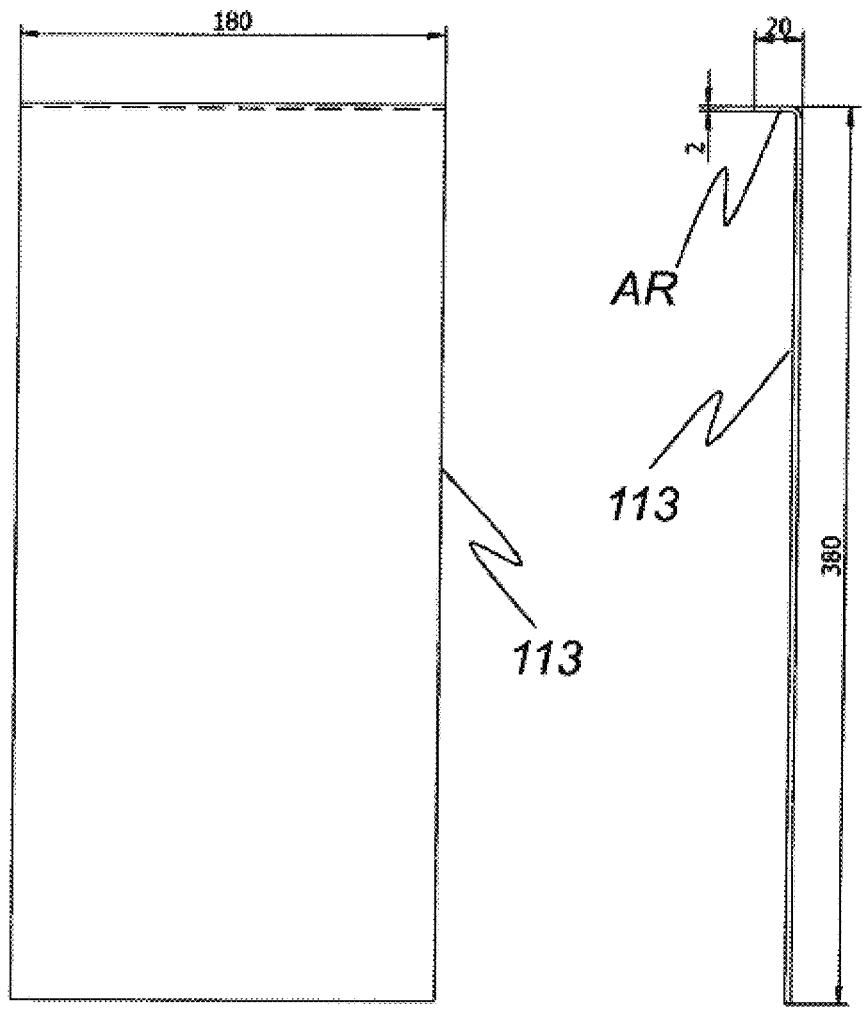
FIG. 5 shows a heat-conducting plate according to embodiments of the invention, by way of example.
Figure 5:
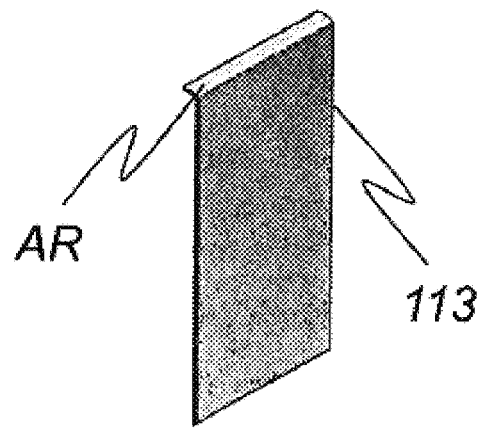

FIG. 5 shows two dimensioned views and a perspective view of a heat-conducting plate 113 according to embodiments of the invention, by way of example. The heat-conducting plate 113 shown can be attached for example to the side, in front of a heat source 110, such that an undesired escape of the generated heat, to the side, is prevented. The beveled edge AR of the heat-conducting plate 113 increases the stability thereof and furthermore allows for simple fixing, for example to an upper heat-conducting plate, as shown in FIG. 4, for example by means of rivets.

Figure 6:
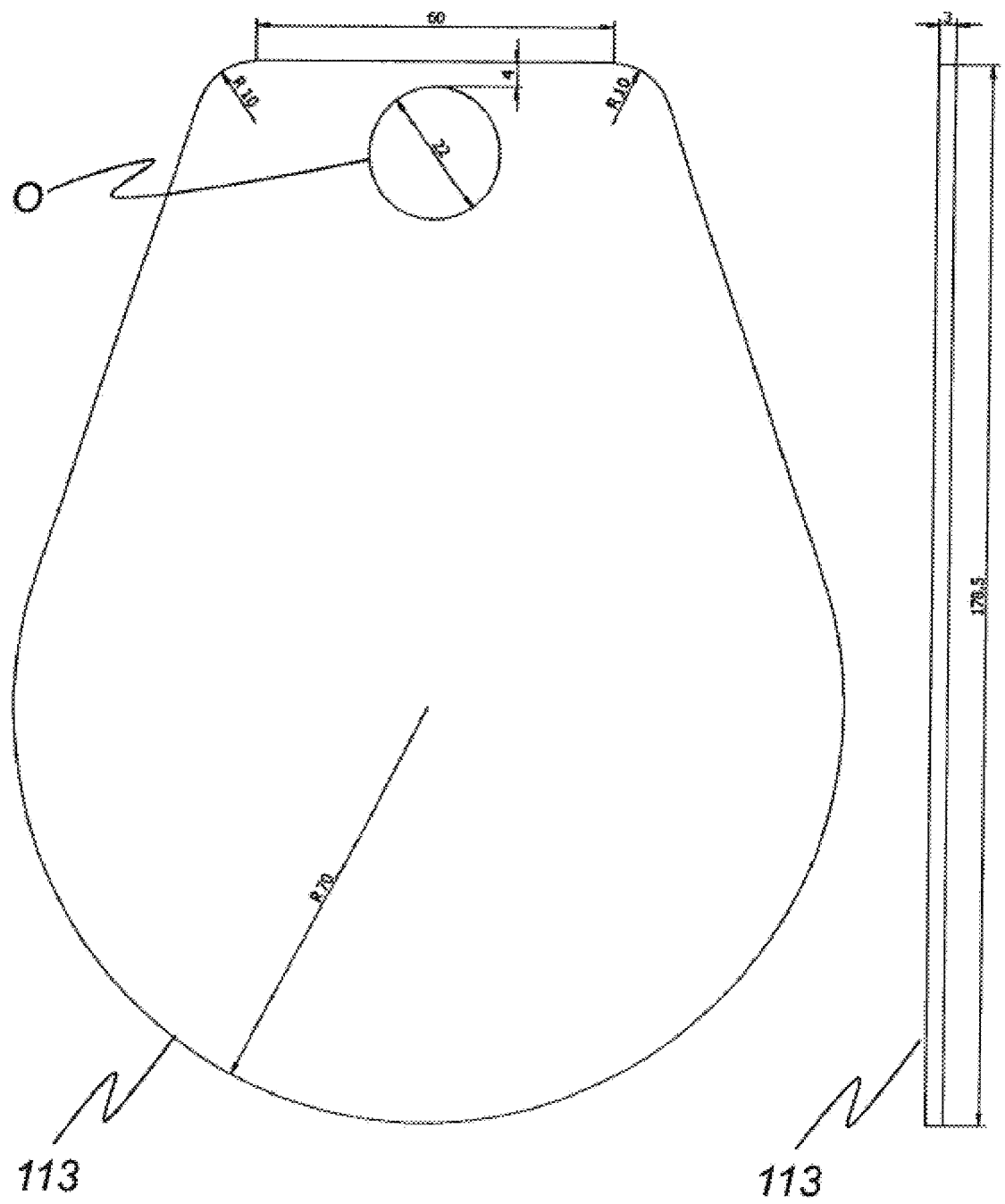
FIG. 6 shows a support for food to be grilled, according to embodiments of the invention, by way of example.

FIG. 6 shows two dimensioned views of a support for food to be grilled 120 according to embodiments of the invention, by way of example. The support for food to be grilled 120 shown comprises an opening O, by means of which it can be pushed for example onto a retaining element. The position of the opening O on the edge of the support for food to be grilled 120 allows for as large as possible a part of the surface of the support for food to be grilled to be used without being impeded. In the example shown, the opening O is round. According to embodiments of the invention, however, other shapes of the opening O are also possible. It is thus possible, for example, by means of a triangular, square of polygonal shape, to prevent the support for food to be grilled 120 from rotating about a retaining element to which it is fastened.

Figure 7:
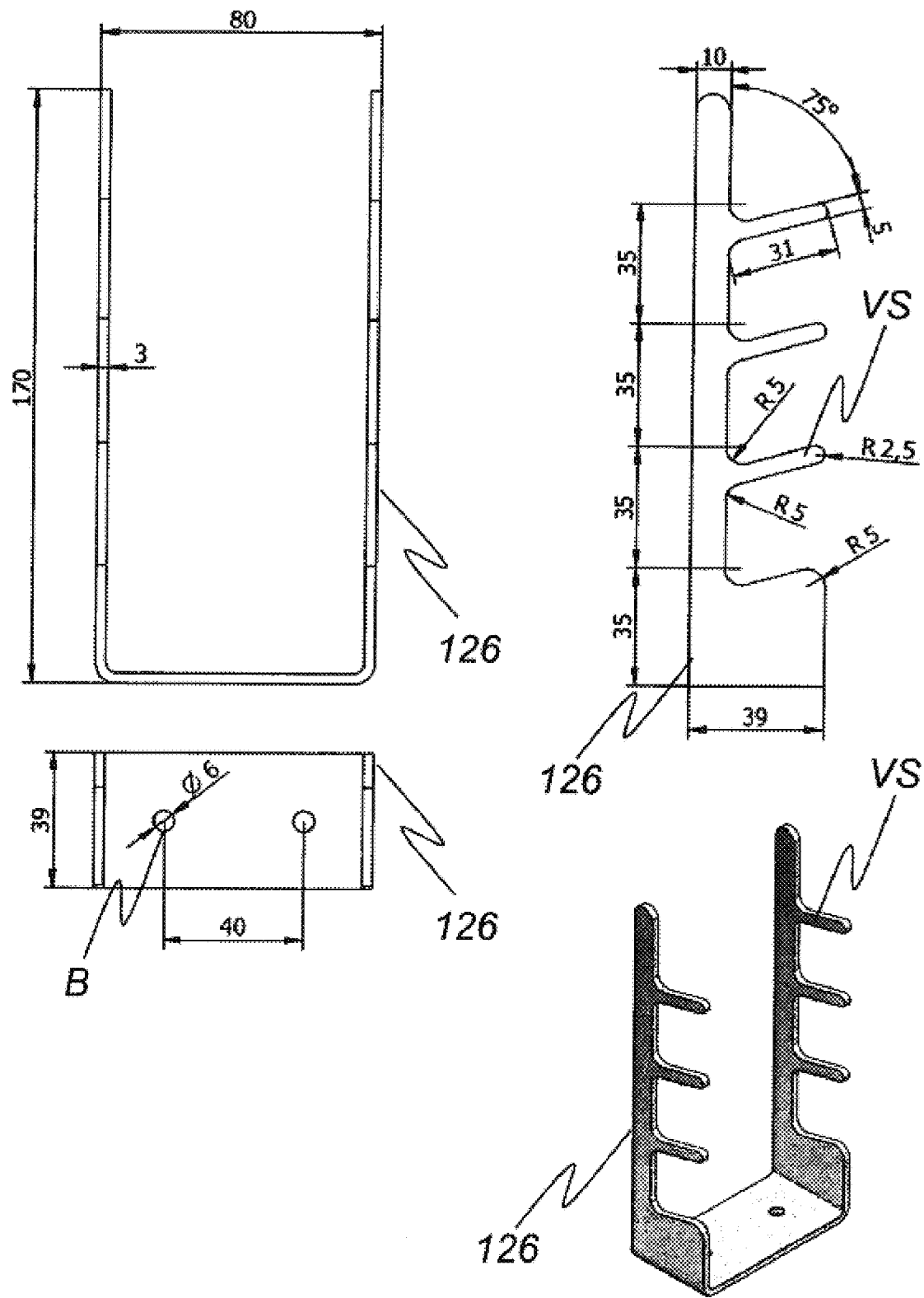
FIG. 7 shows a support element according to embodiments of the invention, by way of example.

FIG. 7 shows three dimensional views and a perspective view of a support element 126 according to embodiments of the invention, by way of example. The support element 126 shown is designed as a storage element, on which elongate food to be grilled can be placed. In the embodiment shown, for example four sausages can be placed on top of one another, wherein the slightly upwardly inclined orientation of the projections VS prevents sausages from rolling downwards form the support element 126, during the grilling process. Two holes B are visible in the base plate of the support element 126, via which holes the support element 126 can be fixed for example to a positioning means 127, for example by means of screws.

Figure 8:
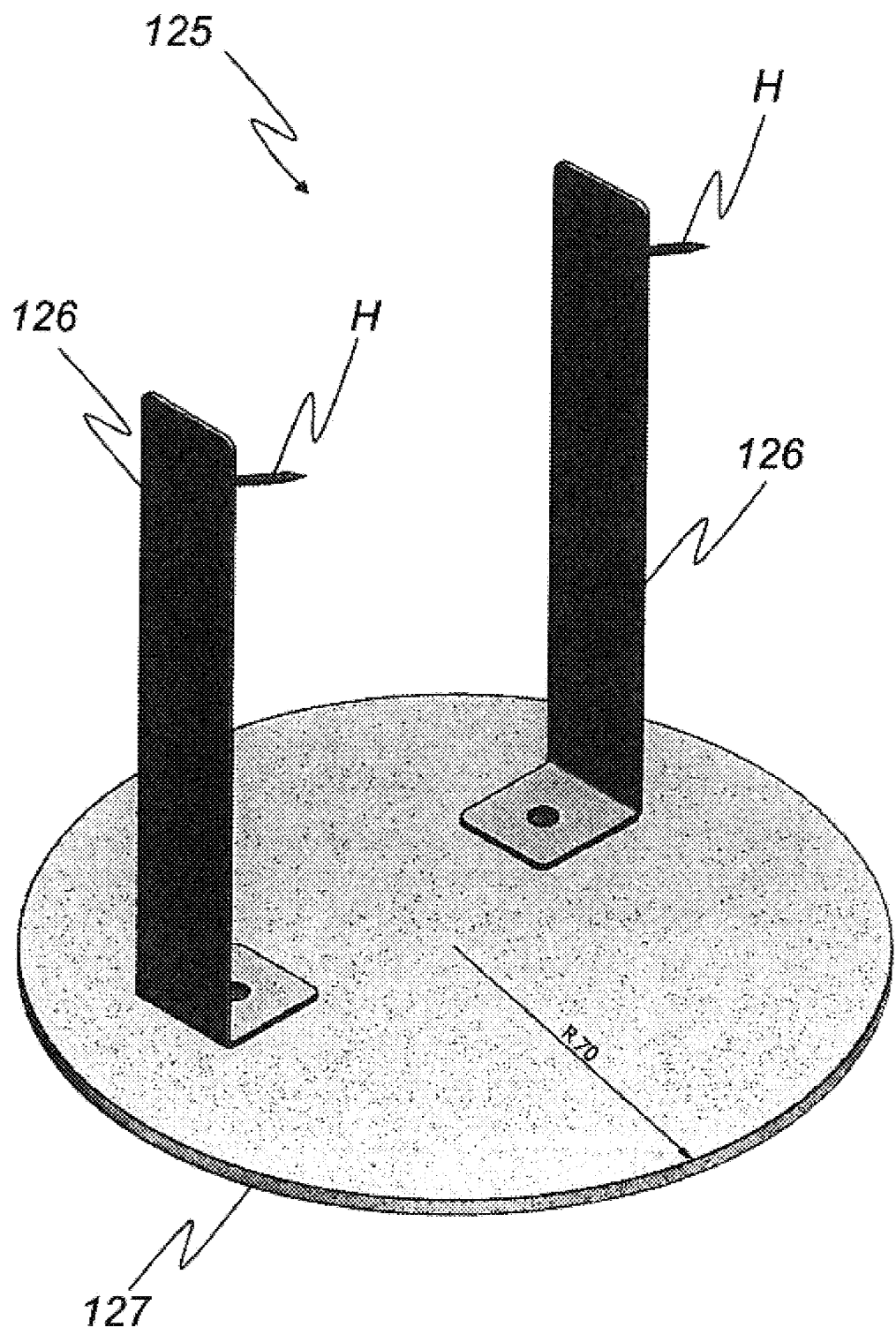
FIG. 8 shows a receiving unit for food to be grilled, according to embodiments of the invention, by way of example.

FIG. 8 is a perspective view of a receiving unit for food to be grilled 125, according to embodiments of the invention, by way of example. The receiving unit for food to be grilled 125 comprises a positioning means 127, using which the receiving unit for food to be grilled 125 can be positioned for example in a bowl for food to be grilled. The positioning means 127 shown is in the form of a disc which fits exactly into an associated bowl for food to be grilled. Two support elements 126 are attached to the positioning means 127, which support elements, in the example shown, are designed as hook elements. Food to be grilled, for example a steak, can be suspended on the hook H of the hook element such that it has only a very small contact surface, specifically only at the hook H, to the receiving unit for food to be grilled 125. Suspension of this kind, in conjunction with a rotation of the support for food to be grilled, makes it possible for the food to be grilled to be grilled uniformly on almost the entire surface thereof, as a result of which a particularly uniform grilling result is advantageously achieved.

Figure 9:
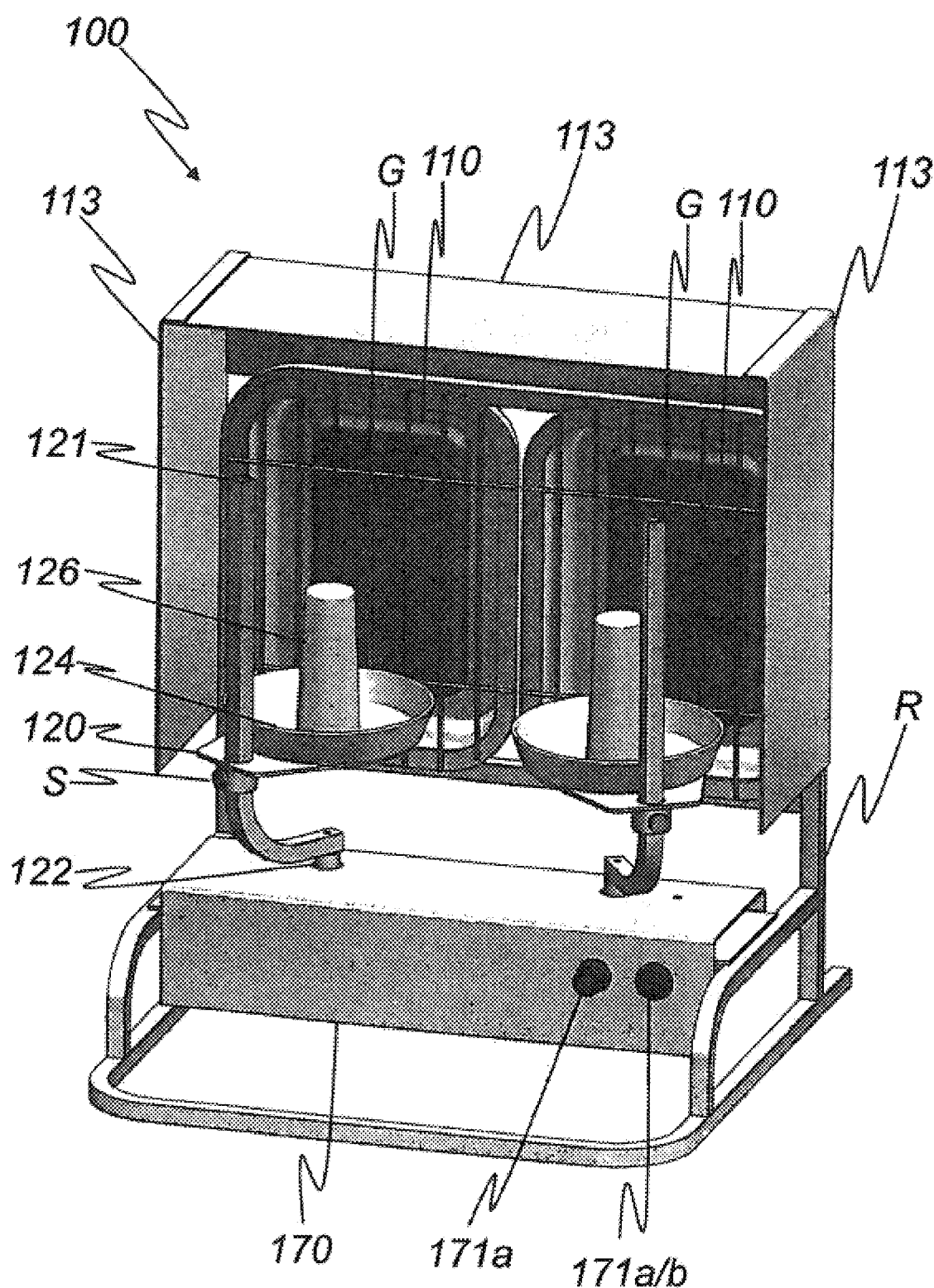
FIG. 9 shows a grill device, according to embodiments of the invention, by way of example.

FIG. 9 is a perspective view of a grill device 100, according to embodiments of the invention, by way of example. In the embodiment shown, the grill device 100 comprises two heat sources 110 that are arranged side-by-side, are designed as gas radiant heaters, and are protected from unintentional touching by means of grilles G. In the example shown the space in front of the heat source 110 is enclosed in part, on three sides, by heat-conducting plates 113 which in this case are formed as anodized aluminum plates. Three heat-conducting plates 113 are shown in FIG. 9. According to embodiments of the invention, any desired number of heat-conducting plates 113 is conceivable, in particular also a single heat-conducting plate 113 which is edged such that it surrounds the space in front of the heat sources 110, in part, on a plurality of sides.

In this example, two supports for food to be grilled 120, of which just one is provided with a reference sign, for the sake of clarity, are located in front of the heat sources 110. The supports for food to be grilled 120 in each case comprise a bowl for food to be grilled 124 for collecting fluid from the food to be grilled. In the example shown, a receiving unit for food to be grilled is located in each of the bowls for food to be grilled 124, of which receiving unit only the relevant support element 126, in the form of a shaft-like extension for skewering food to be grilled is visible. In this example, the supports for food to be grilled 120 are each connected to a retaining element 121 in a detachable and height-adjustable manner by means of a screw S. In this example the retaining element 121, designed as in FIG. 3, is connected to a shaft 122 by its lower end, which shaft is rotated about the longitudinal axis thereof by means of the drive unit of the grill device 100.

The drive unit and the associated power supply are enclosed, at least on the top and on the front side facing the operator, by a housing 170 made for example of anodized aluminum sheet, and are therefore not visible in this drawing. The adjustment unit, by means of which the housing 170 can be pushed onto the frame R of the grill device such that the spacing between the supports for food to be grilled 120 and the heat sources 110 is set, is also hidden by the housing 170 in this drawing. On the front side thereof, the housing 170 comprises, by way of example, an operating element 171*a* in the form of a rotary control for the rotational speed of the drive unit, and an operating and display element 171*a/b* in the form of an on/off switch having indicator lights for the power supply. In order to save weight, the frame R of the grill device 100 consists for example of hollow profiles, in particular of aluminum hollow profiles.

FIG. 10 shows schematic side views of supporting frames 210 according to embodiments of the invention, by way of example. The supporting frames 210 for example each comprise three support rods 212 which are connected for example at the bottom end and at the top end thereof, in each case, by one connection element 213 in each case. The upper connection element 213 can for example be annular, and/or the lower connection element 213 can for example be discoid.

The support rods 212 can be connected to the connection element 213 for example at 0°, 90° and 180° with respect to cylinder coordinates oriented to the vertical axis of rotation DA on which a center point of a connection element 213 is advantageously located.

Figure 10A:
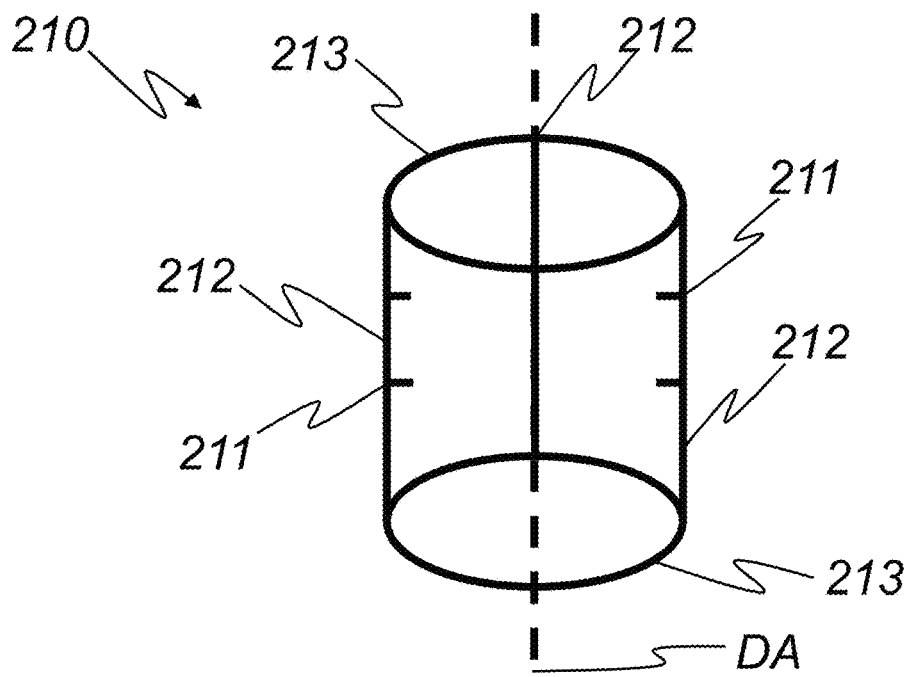
FIG. 10a shows a supporting frame according to embodiments of the invention, by way of example.

In the embodiment shown in FIG. 10*a*, the support rods 212 are straight and are arranged so as to be in parallel with and equidistant from the vertical axis of rotation DA. The support rods each comprise a number of projections which are designed as contact surfaces 211 (labelled only by way of example) for supports for food to be grilled (not shown), and face the axis of rotation DA.

Figure 10B:
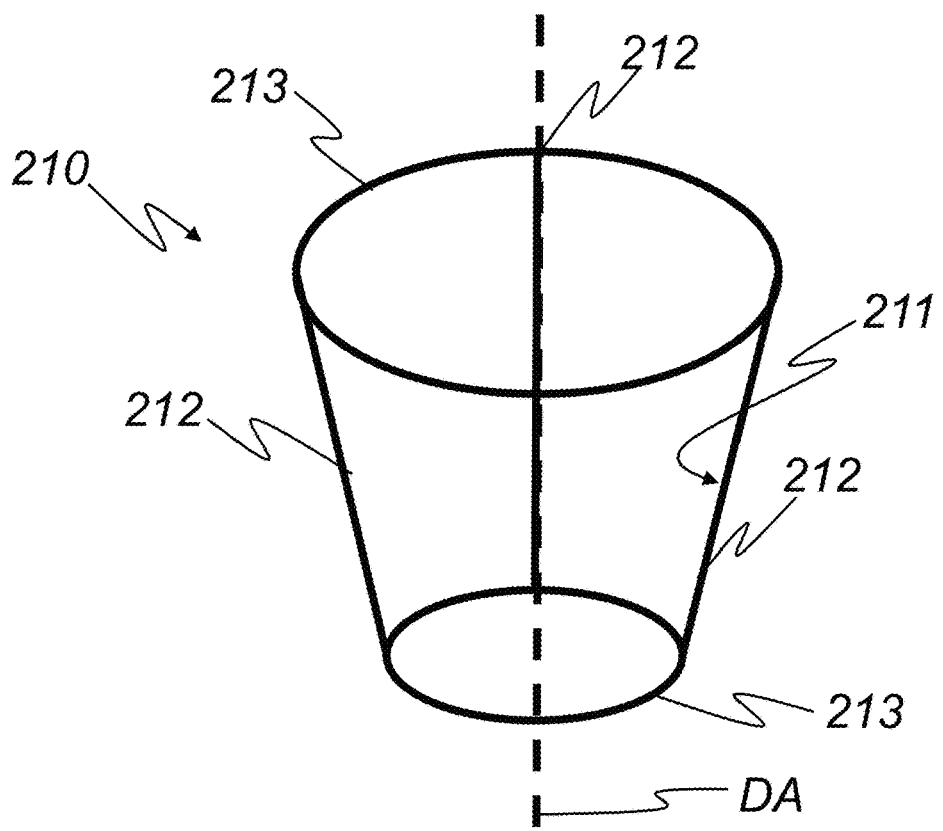
FIG. 10b shows a supporting frame according to embodiments of the invention, by way of example.

In the embodiment shown in FIG. 10*b*, the support rods 212 are straight and are arranged so as to be at a spacing from the vertical axis of rotation DA that expands upwards. In this embodiment, in each case the side of the support rods 212 facing the axis of rotation DA forms a continuous contact surface 211 (labelled only by way of example) for supports for food to be grilled (not shown).

Figure 10C:
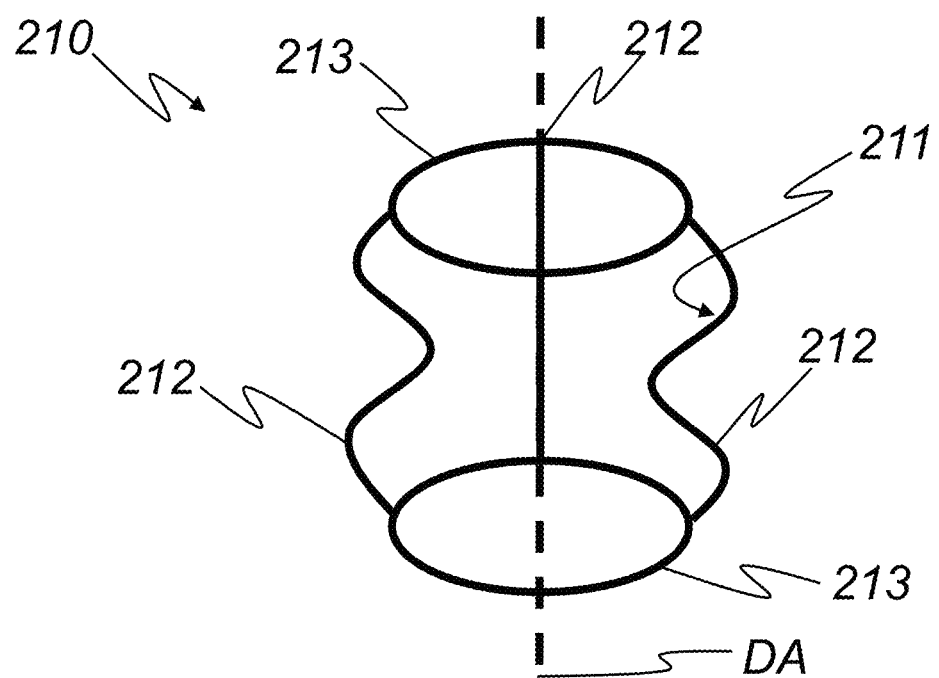
FIG. 10c shows a supporting frame according to embodiments of the invention, by way of example.

In the embodiment shown in FIG. 10*c*, the support rods 212 are bent, such that the spacing thereof from the vertical axis of rotation DA varies along the axis of rotation DA. In this embodiment, in each case the side of the support rods 212 facing the axis of rotation form a contact surface 211 (labelled only by way of example) for supports for food to be grilled (not shown), in regions around the spacing maxima of the support rod 212 from the axis of rotation DA.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE SIGNS

100 portable grill device
110 heat source 111 fastening element
112 controllable valve
113 heat-conducting plate
114 warming unit
120 support for food to be grilled
121 retaining element
122 shaft
123 guiding and bearing unit
124 bowl for food to be grilled
125 receiving element for food to be grilled
126 support element
127 positioning means or positioner
130 drive unit
140 power supply
141 energy store
142 charging unit
143 output
150 adjustment unit
151 stop
152 arresting element
153 adjustment drive
160 regulation unit
170 housing
171a operating element
171b display element
180 illumination element
190 thermometer
200 clock
210 supporting frame
211 contact surface
212 support rod
213 connection element
AR beveled edge
B hole
BL drilled hole
DA axis of rotation
G grille
GF larger surface
H hook
KF smaller surface
O opening
R frame
S screw
VS projection

The invention claimed is:

1. A portable grill device, comprising:
   a. at least one substantially vertical, flat heat source,
   b. at least one support for food to be grilled that is arranged in front of the heat source,
   c. at least one drive unit for rotating the at least one support for food to be grilled about a substantially vertical axis of rotation,
   d. a power supply for supplying the drive unit with the power required for the operation thereof,
   e. at least one adjustment unit which is designed to steplessly adjust a spacing between the at least one heat source and the at least one support for food to be grilled, during operation of the grill device,
   f. wherein the at least one support for food to be grilled is fixed to an L-shaped retaining element,
   g. wherein a longer limb of the L-shaped retaining element is oriented vertically and offset with respect to the substantially vertical axis of rotation, and a shorter limb of the L-shaped retaining element is oriented horizontally,
   h. wherein the shorter limb of the L-shaped retaining element is fixed to a shaft that is oriented vertically and that is operatively connected to the at least one drive unit, and
   i. wherein the shaft is guided and mounted only in a portion of the shaft below the at least one support for food to be grilled in a guiding and bearing unit.

2. The portable grill device according to claim 1, wherein the power supply comprises at least one energy store and at least one charging unit for charging the at least one energy store.

3. The portable grill device according to claim 1, wherein the at least one heat source
   a. is designed as a gas radiant heater and comprises a fastening element for detachably fastening a gas cartridge that is connected to the gas radiant heater, and/or an electrically controllable valve for adjusting the gas flow into the gas radiant heater,
   b. is provided with a number of heat-conducting plates which extend in the direction perpendicular to the radiating surface of the at least one heat source, as far as a minimum spacing of the axis of rotation of the at least one support for food to be grilled from the at least one heat source, and/or
   c. comprises a warming unit which is designed to be fixed, detachably, in the waste heat flow above the at least one heat source, and to receive the food to be grilled and/or containers suitable for food to be grilled.

4. Portable grill device according to claim 1, wherein the at least one support for food to be grilled
   a. is fixed to the L-shaped retaining element so as to be height-adjustable and/or detachable,
   b. comprises at least one bowl for food to be grilled comprising a raised edge region for receiving grilling fluid during the grilling process, and/or
   c. includes at least one receiving unit for food to be grilled, comprising at least one support element, in the form of a shaft-like extension for skewering a food to be grilled, a storage element for placing on a food to be grilled, a clamping element for clamping a food to be grilled, and/or a hook element for suspending a food to be grilled, and including at least one positioner for positioning the receiving unit for food to be grilled on a support for food to be grilled and/or in a bowl for food to be grilled.

5. The portable grill device according to claim 1, wherein the shaft is guided and mounted in at least two vertically mutually spaced ball bearings.

6. The portable grill device according to claim 1, wherein the at least one drive unit
   a. is arranged under the at least one support for food to be grilled, and/or
   b. is designed to cause the at least one support for food to be grilled to rotate at an adjustable speed and/or in a manner having an adjustable speed profile.

7. The portable grill device according to claim 1, wherein the power supply comprises:
   a. at least one energy store that is designed as a battery or accumulator,
   b. at least one charging unit that is designed as a wind turbine, a Peltier element, a photo-voltaic module, and/or as a connection for an external power supply intended for charging the at least one energy store, and/or
   c. an output for connecting further energy loads.

8. The portable grill device according to claim 1, wherein the adjustment unit a. supports a support for food to be grilled, wherein the adjustment unit also supports the at least one drive unit and/or the power supply;
b. is designed such that the vertical orientation of the axis of rotation of the support for food to be grilled is maintained in the event of a change in the spacing between the heat source and the support for food to be grilled;
c. comprises a support which is displaceable on a rail system, by roller bearings;
d. comprises at least one stop which specifies a minimum spacing between the at least one heat source and the at least one support for food to be grilled;
e. comprises at least one arresting element for arresting the adjustment unit, and/or
f. comprises an adjustment drive for motorized driving of the adjustment unit.

9. The portable grill device according to claim 1, wherein the portable grill device comprises a regulation unit which is designed to electronically regulate the speed of rotation of the drive unit, the heating power of the at least one heat source, and/or the position of the adjustment unit, in a programmed manner, wherein the regulation unit:
a. comprises at least one camera for imaging the food to be grilled, and/or
b. comprises at least one communications element for wireless, exchange of measurement and/or control data with a mobile communications device.

10. The portable grill device according to claim 1, wherein the portable grill device comprises a housing which surrounds the at least one drive unit, the power supply and/or the regulation unit at least in part, and comprises at least one operating element and/or display element that is designed for setting and/or displaying the operating state at least of the at least one heat source, the at least one drive unit, the power supply, the adjustment unit and/or the regulation unit.

11. The portable grill device according to claim 1, wherein the portable grill device comprises:
a. at least one illumination element that is designed to illuminate the food to be grilled and/or the at least one operating element and/or display element, and comprises at least one LED light and/or optical fiber, and/or
b. at least one thermometer that can be detachably fixed to the at least one support for food to be grilled and/or a retaining element, and/or
c. at least one clock, a timer and/or a kitchen timer.

12. The portable grill device according to claim 1, wherein the portable grill device
a. is designed so as to be open;
b. can be folded or dismantled without the use of tools, and/or
c. comprises at least one carrying handle that is thermally decoupled, by an insulator, from the heat source that is mechanically connected thereto.

13. The portable grill device according to claim 1, comprising at least one, height-adjustable, stand for setting up the portable grill device.

* * * * *